US012625395B2

(12) United States Patent
Chen

(10) Patent No.: US 12,625,395 B2
(45) Date of Patent: May 12, 2026

(54) SIDE COVER ASSEMBLY OF GLASSES FRAME

(71) Applicant: PROHERO GROUP CO., LTD., Tainan City (TW)

(72) Inventor: Pen-Wei Chen, Tainan City (TW)

(73) Assignee: Prohero Group Co., Ltd., Tainan City (TW)

( * ) Notice: Subject to any disclaimer, the term of this patent is extended or adjusted under 35 U.S.C. 154(b) by 324 days.

(21) Appl. No.: 18/402,221

(22) Filed: Jan. 2, 2024

(65) Prior Publication Data

US 2025/0216704 A1 Jul. 3, 2025

(51) Int. Cl.
*G02C 11/00* (2006.01)

(52) U.S. Cl.
CPC .......... *G02C 11/12* (2013.01); *G02C 2200/06* (2013.01)

(58) Field of Classification Search
CPC ............... G02C 11/12; G02C 2200/06; G02C 2200/08
USPC ........................................................ 351/158
See application file for complete search history.

(56) References Cited

U.S. PATENT DOCUMENTS

| | | | | |
|---|---|---|---|---|
| 5,548,351 | A * | 8/1996 | Hirschman ............ | G02C 11/00 351/44 |
| 5,798,815 | A * | 8/1998 | Hirschman ............ | G02C 11/12 351/44 |
| 7,938,533 | B2 * | 5/2011 | Shapiro .................. | G02C 5/146 351/158 |
| 8,087,774 | B2 * | 1/2012 | Yang ........................ | G02C 7/16 351/44 |
| 9,201,251 | B2 * | 12/2015 | Sadler ..................... | G02C 11/12 |
| 10,365,505 | B2 * | 7/2019 | Chen ...................... | G02C 11/12 |
| 10,627,652 | B2 * | 4/2020 | Froissard ............... | G02C 5/008 |
| 12,248,199 | B1 * | 3/2025 | Chen ...................... | G02C 11/12 |
| 2010/0110366 | A1 * | 5/2010 | Shapiro .................. | G02C 5/143 351/112 |
| 2010/0296046 | A1 * | 11/2010 | Yang ........................ | G02C 7/16 351/158 |
| 2014/0125941 | A1 * | 5/2014 | Hou ........................ | G02C 11/12 351/121 |
| 2017/0269375 | A1 * | 9/2017 | Chou ........................ | G02C 5/10 |
| 2020/0142223 | A1 * | 5/2020 | Chen ...................... | G02C 5/146 |
| 2020/0301167 | A1 * | 9/2020 | Chen ...................... | G02C 5/146 |
| 2021/0263344 | A1 * | 8/2021 | Chen ...................... | G02C 11/12 |
| 2023/0132887 | A1 * | 5/2023 | Gross ...................... | G02C 11/12 351/158 |
| 2024/0319519 | A1 * | 9/2024 | Wu ........................ | G02C 5/2254 |
| 2025/0164828 | A1 * | 5/2025 | Chen ...................... | G02C 5/146 |

* cited by examiner

*Primary Examiner* — William R Alexander
(74) *Attorney, Agent, or Firm* — Rosenberg, Klein & Lee

(57) ABSTRACT

A side cover assembly of glasses frames is provided. The side cover assembly mainly includes a carrier edge portion projecting from an edge of the glasses frame and a side cover unit installed on the carrier edge portion and located under a temple. The side cover unit consists of a cover piece and a mounting flange arranged at the cover piece for being mounted in the carrier edge portion correspondingly. The cover piece is provided with locking members on an upper end and a lower end for being mounted and positioned into the glasses frame. Thereby the side cover unit is firmly connected to the glasses frame, without affecting folding and unfolding of the temple. Therefore, the side cover unit is assembled firmly and convenient to use.

7 Claims, 7 Drawing Sheets

SIDE COVER ASSEMBLY OF GLASSES FRAME

BACKGROUND OF THE INVENTION

Field of the Invention

The present invention relates to an assembly of glasses frame, especially to a side cover assembly of glasses frames for shielding sides of the glasses frame.

Description of Related Art

In our daily lives, eyewear or sun glasses are used to protect eyes from strong sun light or prevents flying foreign bodies from getting into the eyes through sides of the glasses. A side shield is also added on each of two sides of a glasses frame in order to protect eyes.

Besides wearing sunglasses for sun light protection, people often wear various kinds of goggles to protect eyes from injury caused by strong wind or foreign objects during work or high speed movement. The googles normally have side covers which are extended from two sides of the frame correspondingly and used to cover area surrounding the eyes for shielding the eyes against strong wind and foreign matters. However, the side covers on the two sides of the frame of the goggles are integrally formed together with the frame. Users can't select the style of the side cover according to their preferences and a certain space is required for its storage.

Moreover, there is a kind of protective side shield which is able to be detachably mounted to an outer side of a temple. Yet the temple is unable to be folded after the protective side shield being disposed on the glasses while in use. The temple can be folded only after the protective side shield being detached. Although such design overcomes shortcomings of the above integrally formed design, the temple is still unable to be folded while in use. The side shield is easy to wear after repeated disassembly and installation and thus unable to connect to the glasses firmly. Thus there is a gap between the side shield and the temple and the side shield is easy to come off. There are still certain disadvantages.

Thus there is room for improvement and there is a need to provide a novel side cover assembly of glasses frames which is more convenient to use.

SUMMARY OF THE INVENTION

Therefore, it is a primary object of the present invention to provide a side cover assembly of glasses frames. A side cover for shielding is mounted to each of two sides of the glasses frame without affecting normal functions and uses of temples.

In order to achieve to the above object, a side cover assembly of glasses frames according to the present invention mainly includes a carrier edge portion projecting from an edge of the glasses frame and a side cover unit mounted to the carrier edge portion and located under a temple. The side cover unit is provided with a cover piece and a mounting flange is disposed on the cover piece for being mounted in the carrier edge portion correspondingly. The cover piece is provided with a locking bump and a locking block respectively on an upper end and a lower end thereof for being mounted and positioned in the glasses frame. Thereby the side cover unit is secured firmly to the glasses frame, without affecting folding and unfolding of the temple. Therefore, the side cover unit is assembled firmly and convenient to use.

Preferably, the glasses frame is provided with an inner lateral surface while the carrier edge portion is provided with a curved loading surface which is perpendicular and adjacent to the inner lateral surface. The mounting flange is provided with an edge surface and a curved surface respectively attached to and in contact with the inner lateral surface and the curved loading surface of the glasses frame correspondingly. The locking block is arranged at the curved surface.

Preferably, one end of the locking block is provided with a first inclined surface while a mounting slot is provided with a second inclined surface corresponding to and in contact with the first inclined surface.

Preferably, the locking bump is an inclined projection having a higher inner side and a lower outer side; the recess is an inclined groove having a shape corresponding to a shape of the locking bump.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
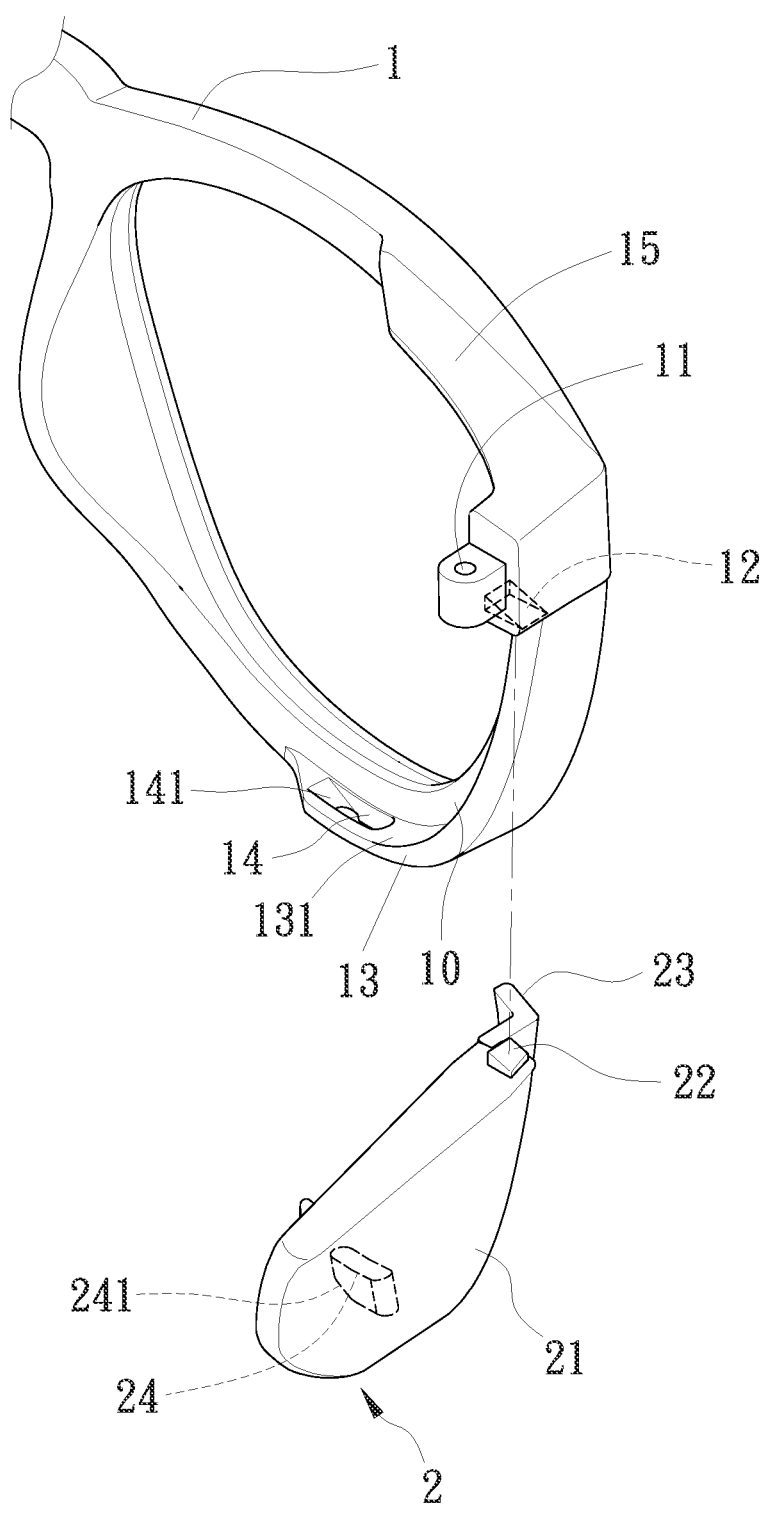
FIG. 1 is an exploded view of an embodiment according to the present invention.

In order to learn technical content, features, and functions of the present invention more clearly and completely, please refer to the following embodiments with related figures and reference signs.

Refer to FIG. 1-4, a glasses frame 1 is provided with a pivot portion 11 disposed on an outer side thereof and connected with a temple. A recess 12 is arranged at a bottom surface of the pivot portion 11 and a carrier edge portion 13 is projecting from an edge of the glasses frame 1 under the pivot portion 11. A mounting slot 14 is formed on a surface of the carrier edge portion 13. A side cover unit 2 is installed on the carrier edge portion 13 and composed of a cover piece 21, a locking bump 22, a mounting flange 23, and a locking block 24. The locking bump 22 is disposed on a top surface of the cover piece 21 and corresponding to the recess 12 so that the locking bump 22 and the recess 12 are mounted and positioned by each other. The mounting flange 23 is arranged at the cover piece 21 and corresponding to the carrier edge portion 13 for being mounted in the carrier edge portion 13 correspondingly. The locking block 24 is disposed on a bottom surface of the mounting flange 23 and corresponding to the mounting slot 14. Thus the locking block 24 is able to be mounted and positioned in the mounting slot 14.

Figure 2:
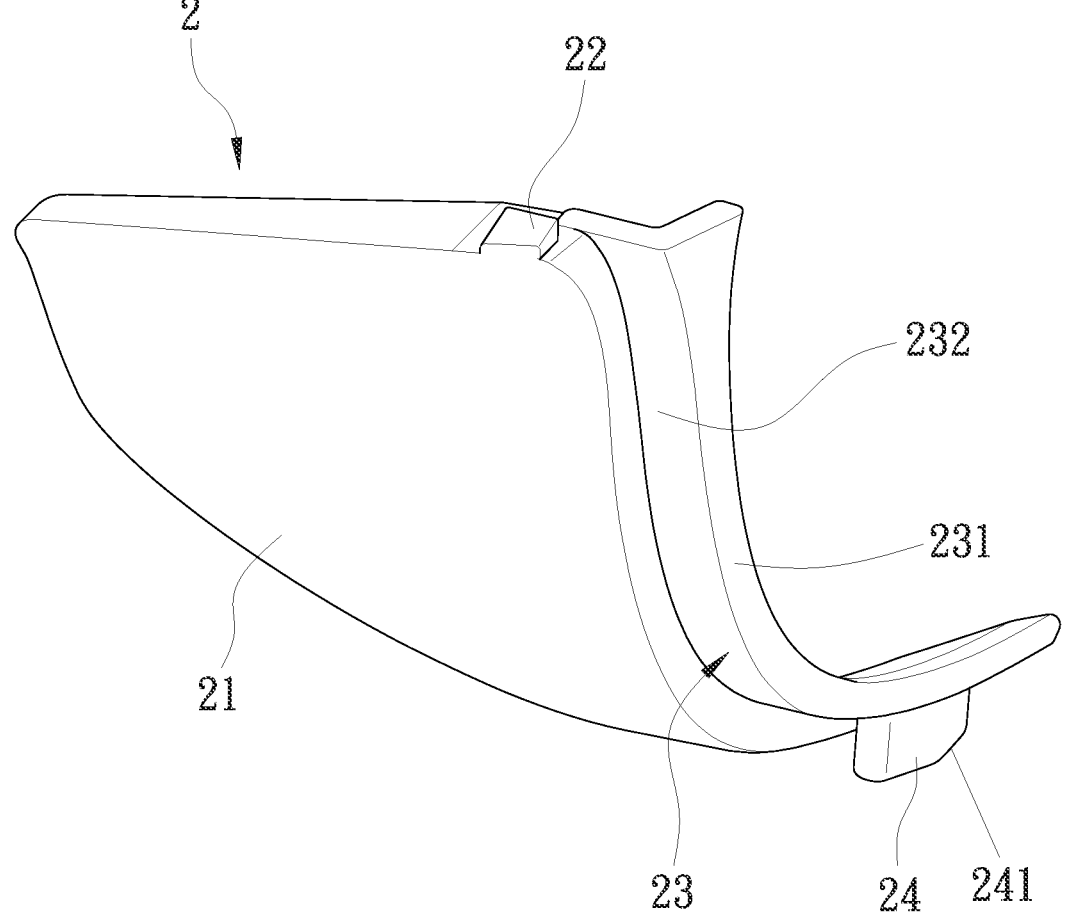
FIG. 2 is a perspective view of an embodiment according to the present invention.
Figure 3:
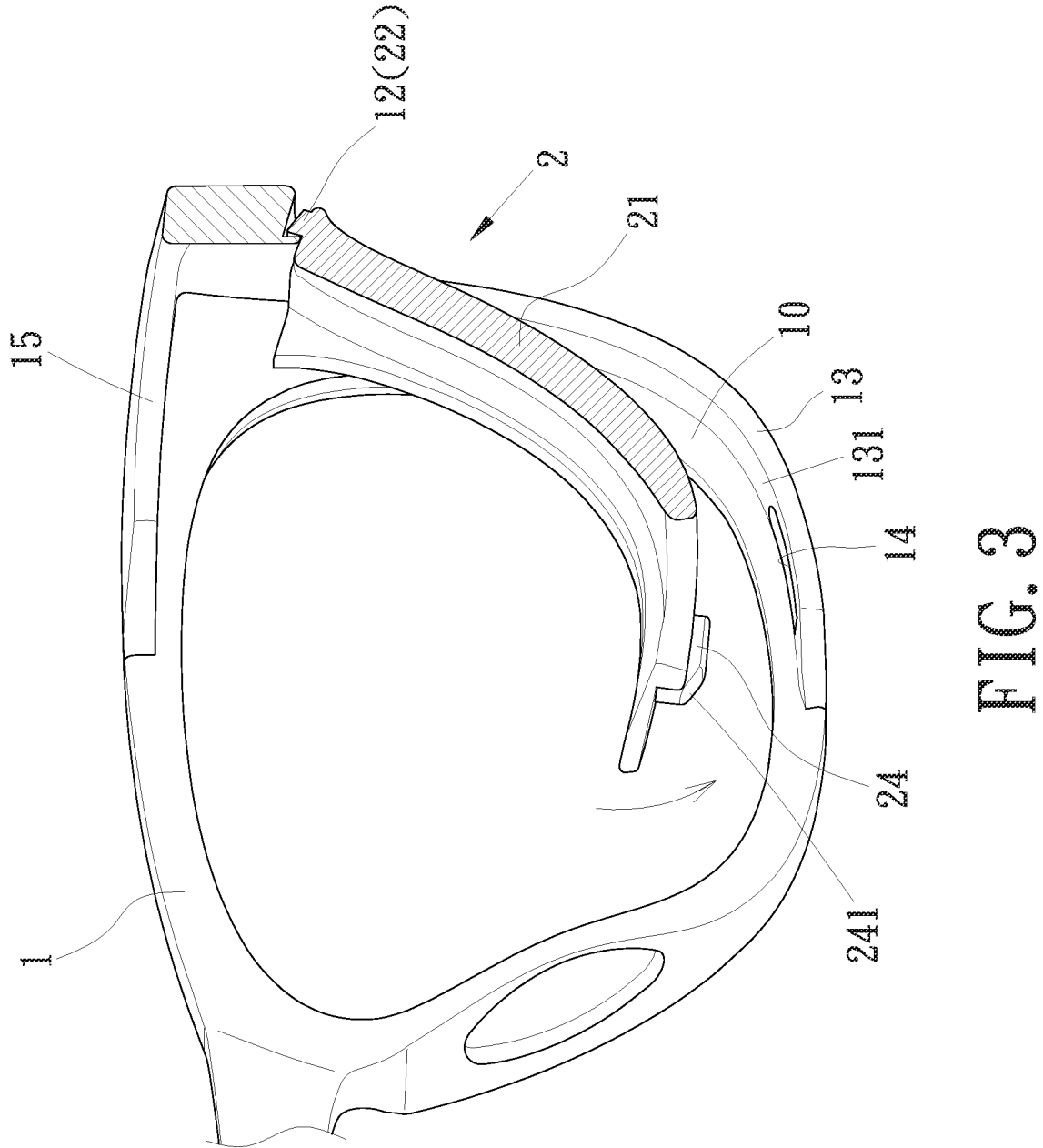
FIG. 3 is a schematic drawing showing assembling of an embodiment according to the present invention.
Figure 4:
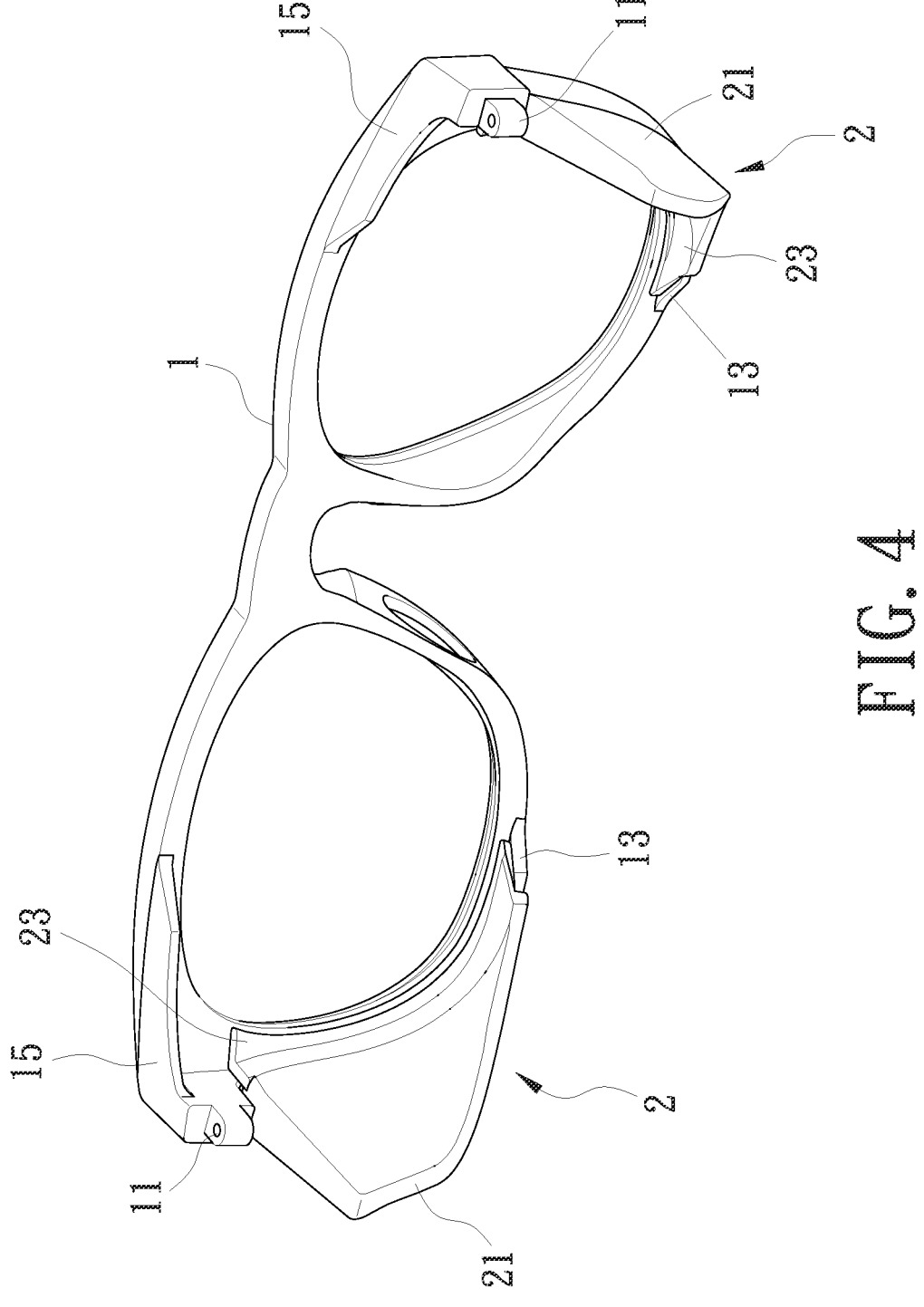
FIG. 4 is a perspective view showing an embodiment mounted to a glasses frame according to the present invention.
Figure 5:
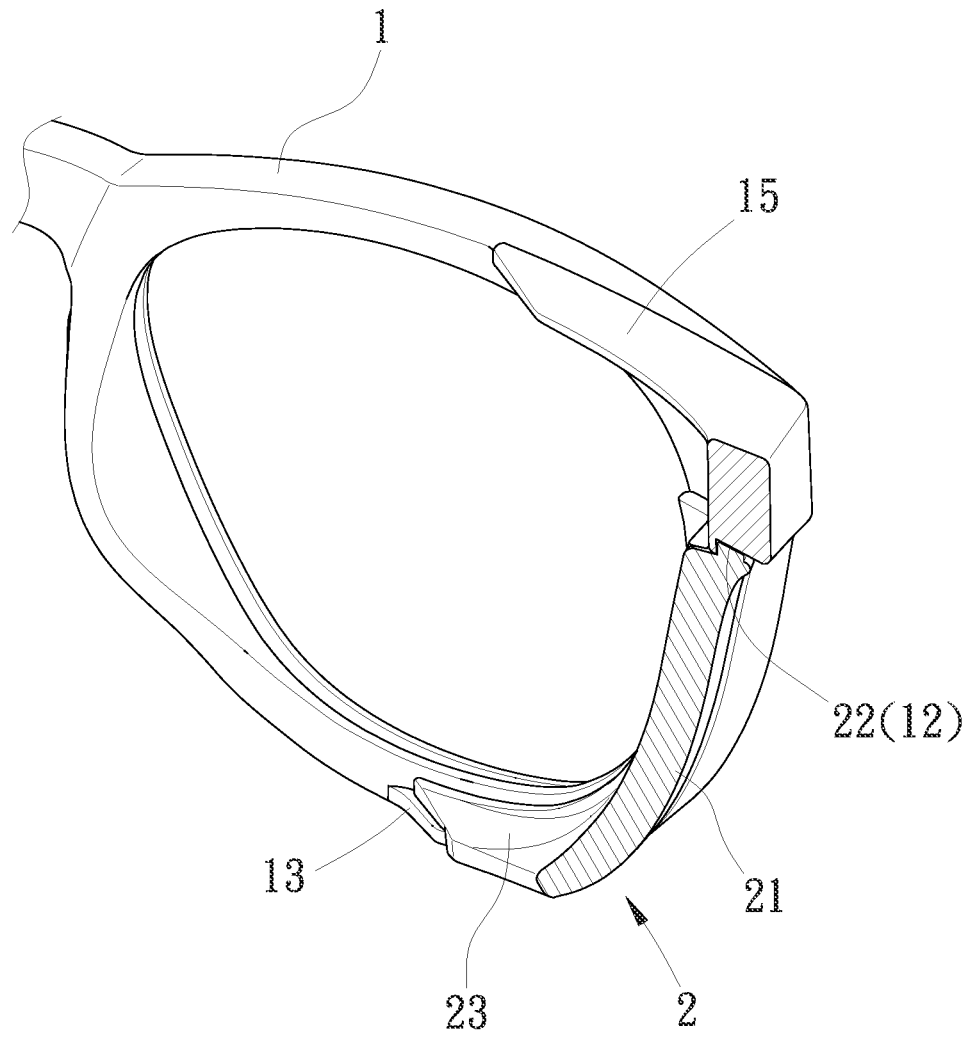
FIG. 5 is a schematic drawing showing a section of an embodiment in which a locking bump and a recess are connected according to the present invention.
Figure 6:
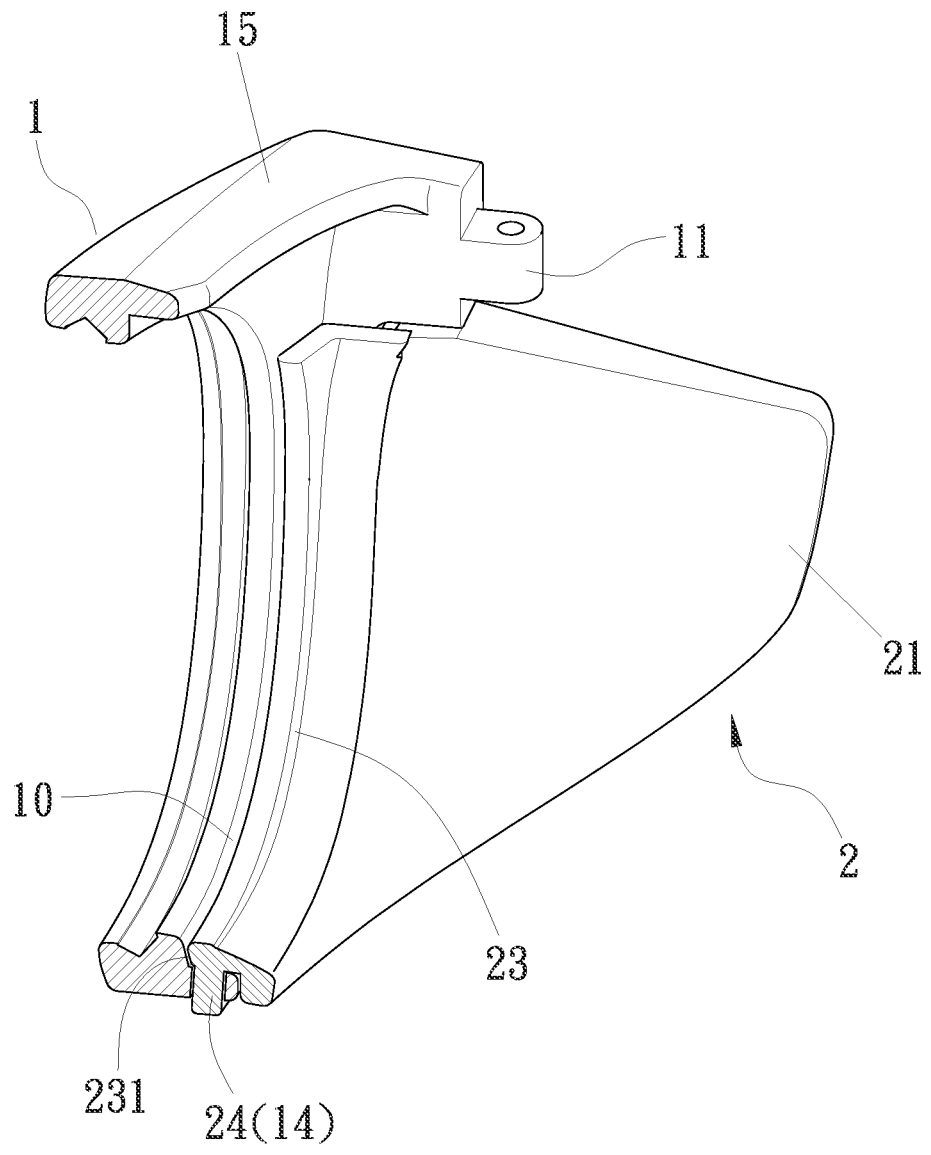
FIG. 6 is a schematic drawing showing a section of an embodiment in which a locking block and a mounting slot are connected according to the present invention.

Refer to FIG. 1-6, while in use, users install the side cover unit 2 on the glasses frame 1 correspondingly. First the locking bump 22 on the top surface of the cover piece 21 is mounted into the recess 12 on the bottom surface of the pivot portion 11. Then the side cover unit 2 is rotated downward and toward the carrier edge portion 13 (as shown in FIG. 3) so that the mounting flange 23 on the cover piece 21 is mounted in the carrier edge portion 13 of the glasses frame 1 correspondingly. At the same time, the locking block 24 on the bottom surface of the mounting flange 23 is also mounted and positioned in the mounting slot 14. The assembly of the side cover unit 2 is completed.

Moreover, as shown in FIG. 1 and FIG. 2, while assembling the side cover unit 2, the glasses frame 1 is provided with an inner lateral surface 10 while the carrier edge portion 13 is provided with a curved loading surface 131 which is perpendicular and adjacent to the inner lateral surface 10. The mounting flange 23 is provided with an edge surface 231 and a curved surface 232 respectively attached to and in contact with the inner lateral surface 10 and the curved loading surface 131 of the glasses frame 1 correspondingly. The locking block 24 is located at the curved surface 232. Thereby the assembly is with better stability.

Furthermore, for more convenient assembly of the side cover unit 2, one end of the locking block 24 is provided with a first inclined surface 241 (as shown in FIG. 1-3). The mounting slot 14 is provided with a second inclined surface 141 (as shown in FIG. 1) corresponding to the first inclined surface 241. The locking bump 22 is an inclined projection having a higher inner side and a lower outer side. The recess 12 is an inclined groove having a shape corresponding to a shape of the locking bump 22. Thereby the assembly of the side cover unit 2 with the glasses frame 1 is more convenient and both are positioned more firmly by the design of the first and the second inclined surfaces 241, 141 and arrangement of the inclined projection and the corresponding inclined groove.

In addition, an upper cover portion 15 is disposed on the pivot portion 11 and extended to a top end of the glasses frame 1 for shielding the top of the eyes. After completing the assembly of the side cover unit 2, a top side and a lateral side around the eyes can be shielded effectively when users wear glasses for prevention of foreign objects, sunlight, etc. At the same time, the side cover unit 2 is securely connected to the glasses frame 1 and located under the temple. Thus the side cover unit 2 will not affect folding or unfolding of the temple. The side cover unit 2 is assembled stably and convenient to use.

Figure 7:
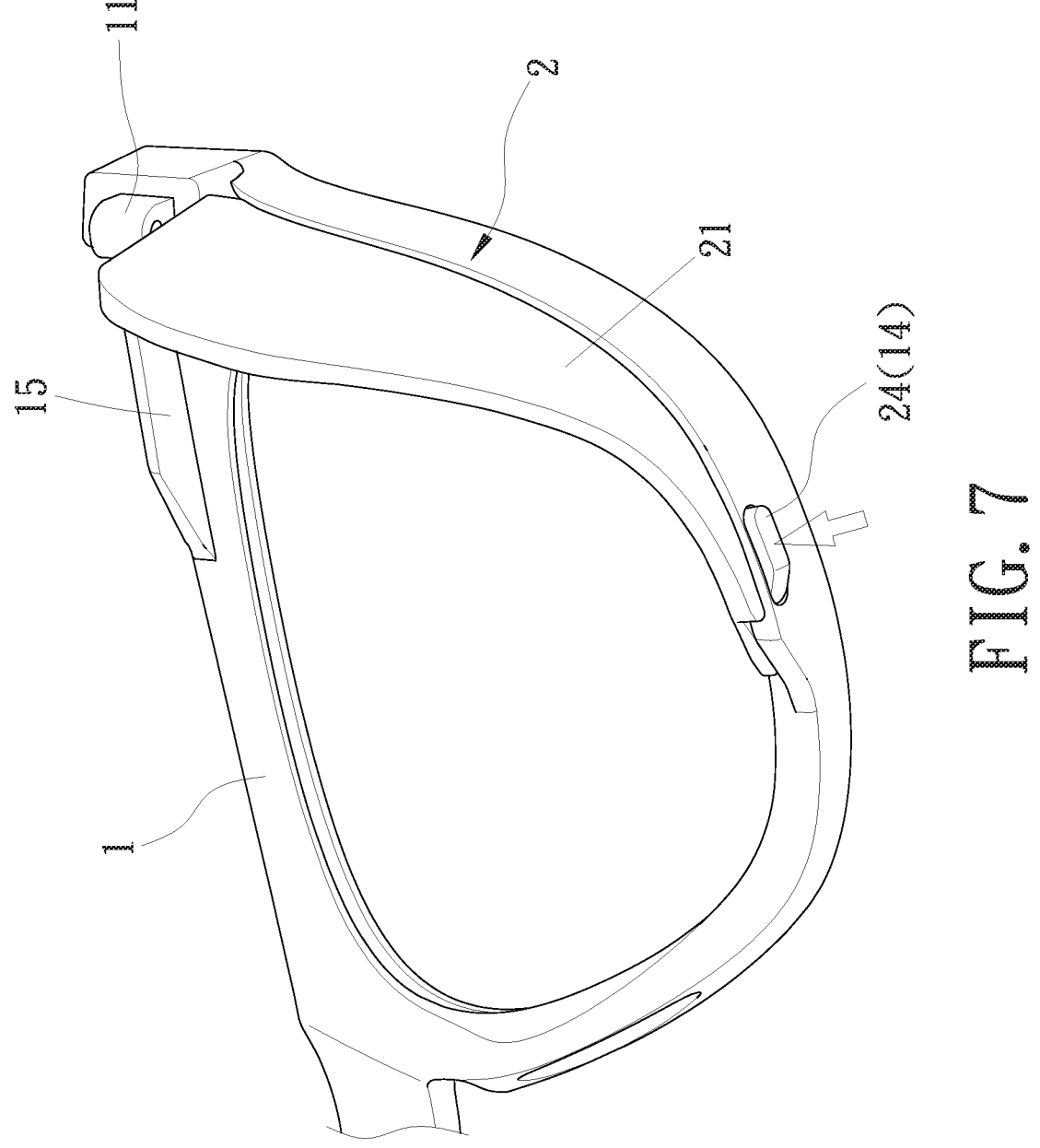
FIG. 7 is a schematic drawing showing an embodiment being detached according to the present invention.

Please also refer to FIG. 7, for disassembly of the side cover unit 2, the locking block 24 is pressed upward to be released from limit of the mounting slot 14 and rotated upward. Thus the locking bump 22 of the cover piece 21 is further released from the recess 12. Thereby the side cover unit 2 is detached from the glasses frame 1 conveniently.

In summary, the side cover assembly of glasses frames according to the present invention has the following advantages compared with the structure available now.

1. In the present side cover assembly, folding and unfolding of the temple will not be affected because the side cover unit is secured firmly to the glasses frame and located under the temple. Thus the side cover unit is assembled stably and convenient to use.

2. By the locking bump and the locking block respectively mounted and positioned in the recess and the mounting slot correspondingly in combination with the first and the second inclined surfaces and the inclined projection and the inclined groove with matched shapes, the side cover unit is assembled more conveniently and positioned more stably.

3. By the locking bump being mounted and positioned in the recess and then rotated, the locking block can be smoothly mounted in the mounting slot to complete the assembly. Or the locking block is operated reversely to be pressed upward and released from the mounting slot. The assembly and disassembly of the side cover assembly are convenient with easy operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A side cover assembly of a glasses frame comprising:
   a pivot portion disposed on an outer side of the glasses frame and connected with a temple;
   a recess arranged at a bottom surface of the pivot portion;
   a carrier edge portion projecting from an edge of the glasses frame under the pivot portion;
   a mounting slot formed on a surface of the carrier edge portion; and
   a side cover unit disposed on the carrier edge portion correspondingly and having a cover piece, a locking bump arranged at a top surface of the cover piece and corresponding to the recess for being mounted and positioned in the recess, a mounting flange disposed on the cover piece and corresponding to the carrier edge portion for being mounted in the carrier edge portion correspondingly, and a locking block arranged at a bottom surface of the mounting flange and corresponding to the mounting slot for being mounted and positioned in the mounting slot.

2. The side cover assembly of the glasses frame as claimed in claim 1, wherein the glasses frame is provided with an inner lateral surface while the carrier edge portion is provided with a curved loading surface which is perpendicular and adjacent to the inner lateral surface; the mounting flange is provided with an edge surface and a curved surface respectively attached to and in contact with the inner lateral surface and the curved loading surface of the glasses frame correspondingly; the locking block is arranged at the curved surface.

3. The side cover assembly of the glasses frame as claimed in claim 1, wherein one end of the locking block is provided with a first inclined surface while the mounting slot is provided with a second inclined surface corresponding to and in contact with the first inclined surface.

4. The side cover assembly of the glasses frame as claimed in claim 2, wherein one end of the locking block is provided with a first inclined surface while the mounting slot is provided with a second inclined surface corresponding to and in contact with the first inclined surface.

5. The side cover assembly of the glasses frame as claimed in claim 3, wherein the locking bump is an inclined projection having a higher inner side and a lower outer side;

the recess is an inclined groove having a shape corresponding to a shape of the locking bump.

6. The side cover assembly of the glasses frame as claimed in claim 4, wherein the locking bump is an inclined projection having a higher inner side and a lower outer side; the recess is an inclined groove having a shape corresponding to a shape of the locking bump.

7. The side cover assembly of the glasses frame as claimed in claim 1, wherein an upper cover portion is disposed on the pivot portion and extended to a top end of the glasses frame for shielding the top of eyes.

\* \* \* \* \*